United States Patent
Kaur et al.

(10) Patent No.: US 9,380,054 B2
(45) Date of Patent: Jun. 28, 2016

(54) APPLICATION SIGNING

(71) Applicant: CELLCO PARTNERSHIP, Basking Ridge, NJ (US)

(72) Inventors: Manmeet Kaur, Freehold, NJ (US);
Petri Virkkula, Kendall Park, NJ (US);
Mauricio Pati Caldeira De Andrada, South Plainfield, NJ (US); Samir S. Vaidya, Highland Park, NJ (US)

(73) Assignee: CELLCO PARTNERSHIP, Basking Ridge, NJ (US)

( * ) Notice: Subject to any disclaimer, the term of this patent is extended or adjusted under 35 U.S.C. 154(b) by 96 days.

(21) Appl. No.: 14/256,706

(22) Filed: Apr. 18, 2014

(65) Prior Publication Data

US 2015/0304307 A1  Oct. 22, 2015

(51) Int. Cl.
*G06F 21/00*  (2013.01)
*H04L 29/06*  (2006.01)
*H04W 12/06*  (2009.01)
*H04W 12/08*  (2009.01)
*H04W 88/02*  (2009.01)

(52) U.S. Cl.
CPC ............ *H04L 63/083* (2013.01); *H04W 12/06* (2013.01); *H04W 12/08* (2013.01); *H04W 88/02* (2013.01)

(58) Field of Classification Search
CPC ............. H04L 63/0815; H04L 63/083; H04L 63/0876; H04L 67/32
See application file for complete search history.

(56) References Cited

U.S. PATENT DOCUMENTS

| | | | |
|---|---|---|---|
| 2007/0016787 A1* | 1/2007 | Benedikt | G11B 20/00086 713/176 |
| 2007/0118558 A1* | 5/2007 | Kahandaliyanage | G06F 9/468 |
| 2012/0110646 A1* | 5/2012 | Ajitomi | G06F 21/335 726/4 |
| 2015/0074759 A1* | 3/2015 | Shanklin | G06F 21/51 726/3 |

OTHER PUBLICATIONS

Mashery: The E-Commerce Force is With Them—InformationWeek. (Jul. 27, 2011). Retrieved Sep. 10, 2015.*

* cited by examiner

*Primary Examiner* — Fatoumata Traore
*Assistant Examiner* — Kendall Dolly

(57) ABSTRACT

Systems and methods for application signing are disclosed. In some implementations, an application package identifier and a password may be received at an application signing server. Upon authenticating the application package identifier and the password, a fingerprint identifying the developer is received. Upon receipt of the fingerprint, the application signing server generates a secure key for the application based on the fingerprint, where the secure key is provided to the developer for inclusion within the application. Upon determining that the application package identifier and the secure key included in a request from an operating system of a mobile device matches an authorized application package identifier and an authorized secure key stored at the application signing server, the application signing server provides the requested list of the one or more APIs to the operating system to grant the application access to the APIs in the list.

20 Claims, 6 Drawing Sheets

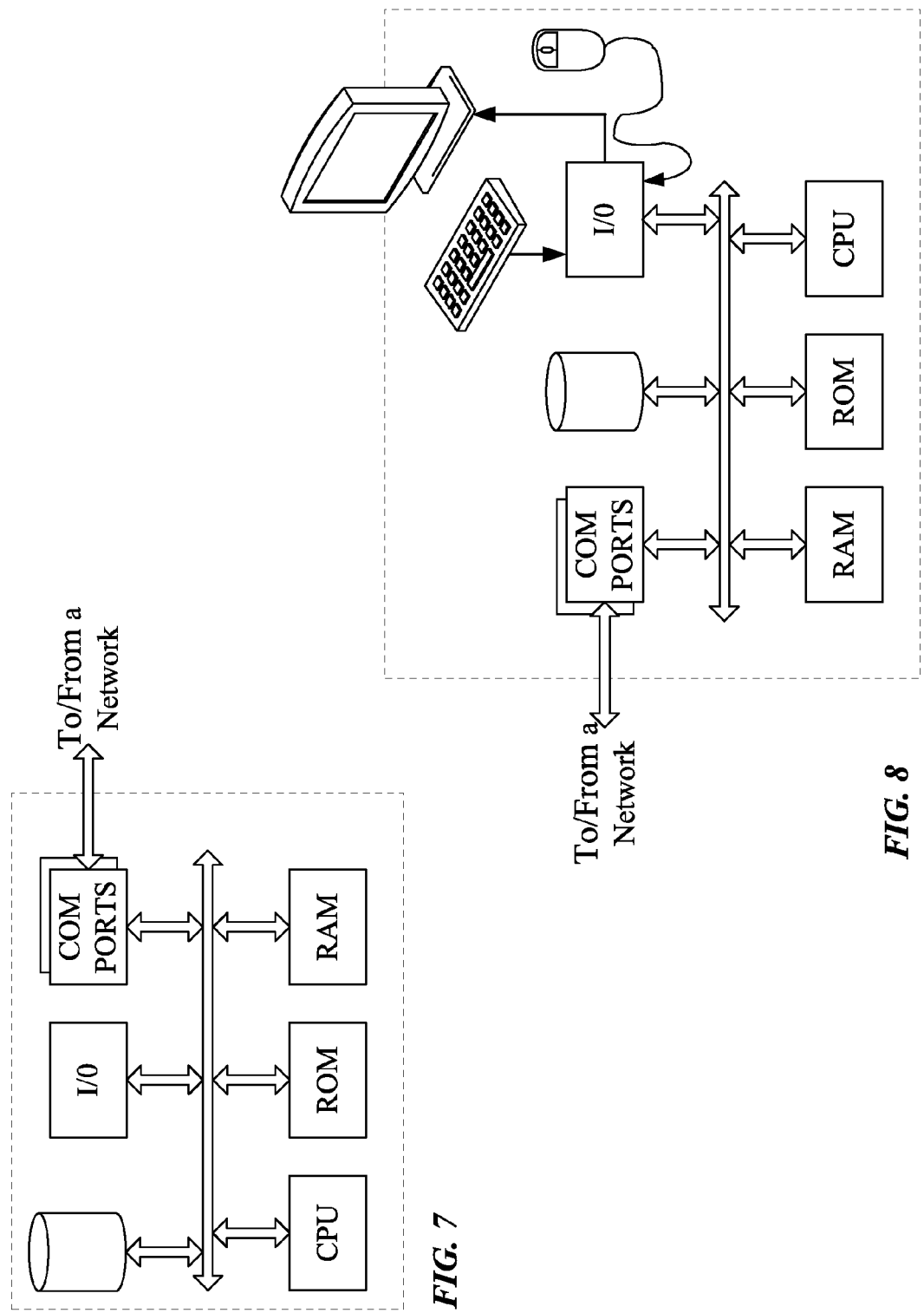

APPLICATION SIGNING

BACKGROUND

Mobile platforms and operating systems may provide application programming interfaces (APIs). These APIs can allow applications to access functions on a mobile device. In order to use such API's, an application operating on the mobile device may need to be signed with a digital signature matching a digital signature of an API needed by the application.

A digital signature is a mathematical scheme for demonstrating authenticity of a software application or digital content. A valid digital signature gives a user or recipient reason to believe that the application was created by a known entity, such that the entity cannot deny having created the application and that the application was not altered during software distribution. Digital signing of an application generally requires a software developer to manually sign the application using an application signing tool. The digital signature can include an application type, an application certificate, and a timestamp. Because an application may need to be signed with a distinct signature for each API that the application may need to access on a mobile device, such a manual signing process becomes inefficient and time consuming.

Often, applications are published on online application marketplaces or "app stores" for subsequent download to mobile devices. For example, applications may be downloaded by users after purchasing them from an app store. Some application marketplaces may not permit publication of applications that have been digitally signed by a software developer more than once. The software developer may, however, need to digitally sign an application more than once for each API that the application may need to access on a mobile device. As a result, application developers are unable to publish applications that need to be signed more than once to such restricted marketplaces. Furthermore, applications may need to be signed each time a new version of the application is to be made available on an application marketplace. Repeated manual digital signing, often necessary during application development, leads to a delay in publishing the application on such marketplaces.

As the foregoing illustrates, a new approach for application signing may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is a simplified functional block diagram of a computer that may be configured as a host or server, for example, to function as the application signing server in the system of FIG. 1.

FIG. 8 is a simplified functional block diagram of a personal computer or other work station or terminal device.

DETAILED DESCRIPTION

Figure 1:
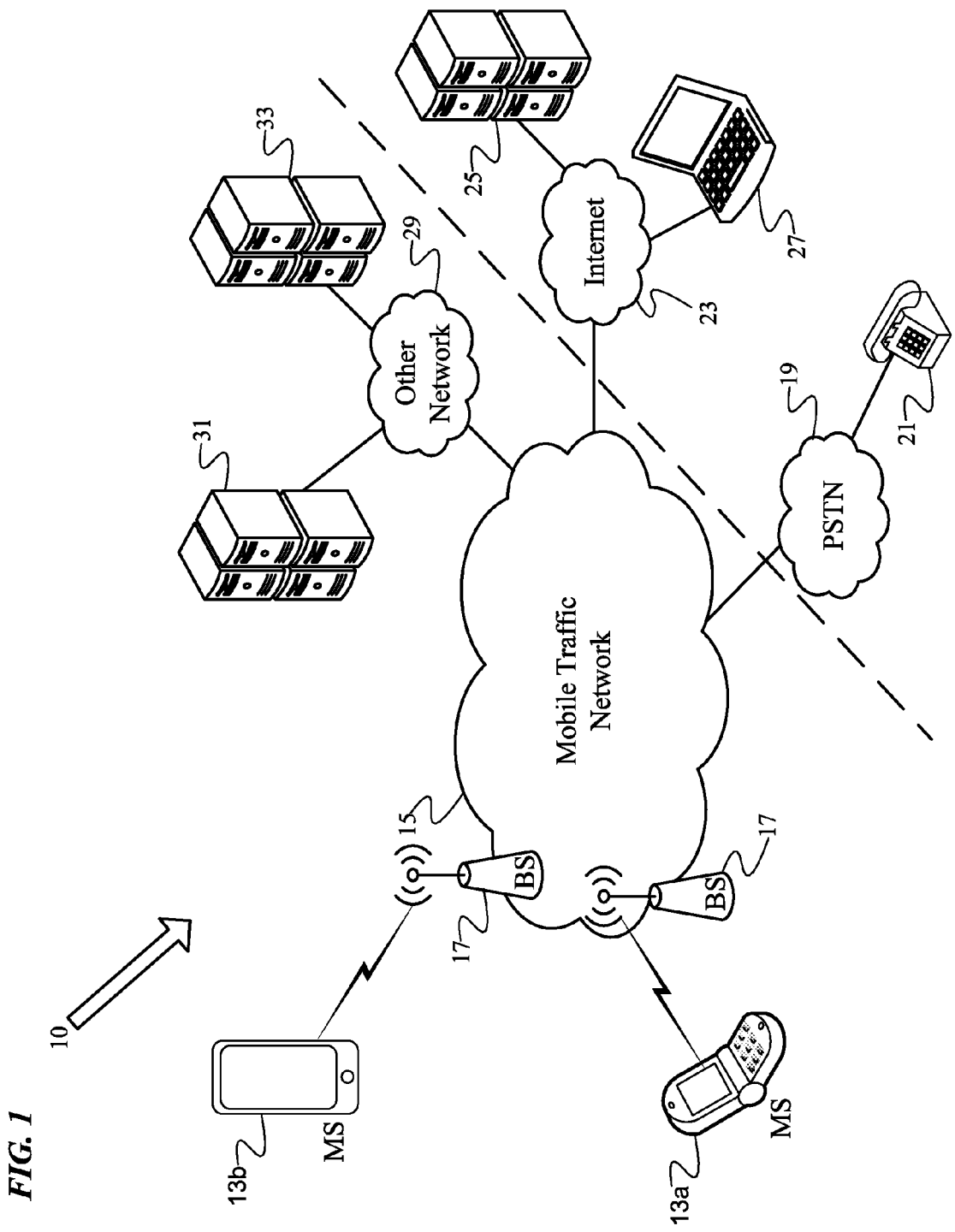
FIG. 1 is a high-level functional block diagram of an exemplary system of networks/devices that provide various communications for mobile stations and support an exemplary application signing service.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations alleviate the burden of manually signing an application for each application programming interface (API) needed by the application. Furthermore, the implementations allow an application to be signed once at an application signing server to allow the application access to multiple APIs needed by the application.

In some implementations, an application package identifier and a password may be received at an application signing server. As an example, the application package identifier and the password may be received from a developer of an application identified by the application package identifier. The password may have been previously provided by the application signing server to the developer. Upon authenticating the received application package identifier and the received password from the developer of the application, the application signing server allows receipt of a digital fingerprint identifying the developer. The digital fingerprint can be, for example, a cryptographic hash. A cryptographic hash function is a hash function that takes an arbitrary block of data and returns a fixed-size bit string, the cryptographic hash value, such that any (accidental or intentional) change to the data would (with very high probability) change the hash value. Upon receipt of the fingerprint identifying the developer, the application signing server generates a secure key for the application based on the fingerprint. The secure key may be provided to the developer for inclusion within the application.

When the application including the secure key is installed at a mobile station, a request for a list of one or more APIs permitted for use by the application at the mobile station may be received at the application signing server from an operating system of the mobile station. The request may include the application package identifier and the secure key associated with the application. The request may be initiated by the operating system based on determining the application's need to access one or more APIs resident at the mobile station. Upon determining that the application package identifier and the secure key matches an authorized application package identifier and an authorized secure key stored at the application signing server, the application signing server provides the requested list of the one or more APIs to the mobile station operating system. The operating system at the mobile station may then grant the installed application access to the APIs in the list.

In this way, because the application may be granted access to a plurality of APIs based on a list from the application signing server that identifies the APIs, the disclosed implementations alleviate the burden of manually signing an application for each API needed by the application. The application accordingly can be published to online application marketplaces without the need for multiple signatures, whether or not the marketplace permits multiple signatures to be used. Furthermore, because the application may need to be signed only once, regardless of a number of APIs that the application may need to access, application signing in accordance with the disclosed implementations is efficient and consumes significantly less time.

Reference now is made in detail to the examples illustrated in the accompanying drawings and discussed below. FIG. 1 illustrates an exemplary system 10 offering a variety of mobile communication services, including communications related to application signing. The example shows simply two mobile stations (MSs) 13a and 13b as well as a mobile communication network 15. The stations 13a and 13b are examples of mobile stations that may include respective operating systems that provide and receive communications related to application signing. However, the network provides similar communications for many other similar users as well as for mobile stations/users that do not participate in the application signing service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, Long Term Evolution (LTE) standard, a time division multiple access (TDMA) standard or other standards used for public mobile wireless communications. The mobile stations 13 may be capable of voice telephone communications through the network 15, and for the application signing services, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The mobile stations 13a and 13 of and users of the applications incorporating the application signing service also can receive and execute applications written in various programming languages, as discussed more later.

Mobile stations 13 can take the form of portable handsets, smart-phones or personal digital assistants, although they may be implemented in other form factors. Program applications, including an application to assist in the application signing service and/or any application purchased on-line can be configured to execute on many different types of the mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier also operates a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application signing server 31. If the mobile service carrier offers the application signing service, the service may be hosted on a carrier operated application signing server 31, for communication via the networks 15 and 29. Alternatively, the application signing service may be provided by a separate entity (alone or through agreements with the carrier), in which case, the service may be hosted on an application server such as server 25 connected for communication via the networks 15 and 23. Servers such as 25 and 31 may provide any of a variety of common application or service functions in support of or in addition to an application program running on the mobile station 13. However, for purposes of further discussion, we will focus on functions thereof in support of the application signing service. For a given service, including the application signing service, an application program within the mobile station may be considered as a 'client' and the programming at application signing server 31 may be considered as the 'server' application for the particular service. In some implementations, the programming at server 25 may act as a client in addition to the mobile station and the programming at application signing server 31 may act as a server.

To insure that the application signing service offered by application signing server 31 is available to only authorized devices/users, the provider of the application service also deploys an authentication server 33. The authentication server 33 could be a separate physical server as shown, or authentication server 33 could be implemented as another program module running on the same hardware platform as the application signing server 31. Essentially, when the application signing server 31 receives a service request from a client application on a mobile station 13, the server application provides appropriate information to the authentication server 33 to allow application signing server 31 to authenticate the mobile station 13 as outlined herein. Upon successful authentication, the server 33 informs the application signing server 31, which in turn provides access to the service via data communication through the various communication elements (e.g. 29, 15 and 17) of the network 10. A similar authentication function may be provided for the application signing service(s) offered via the server 25, either by the server 33 if there is an appropriate arrangement between the carrier and the operator of server 24, by a program on the server 25 or via a separate authentication server (not shown) connected to the Internet 23.

Figure 2:
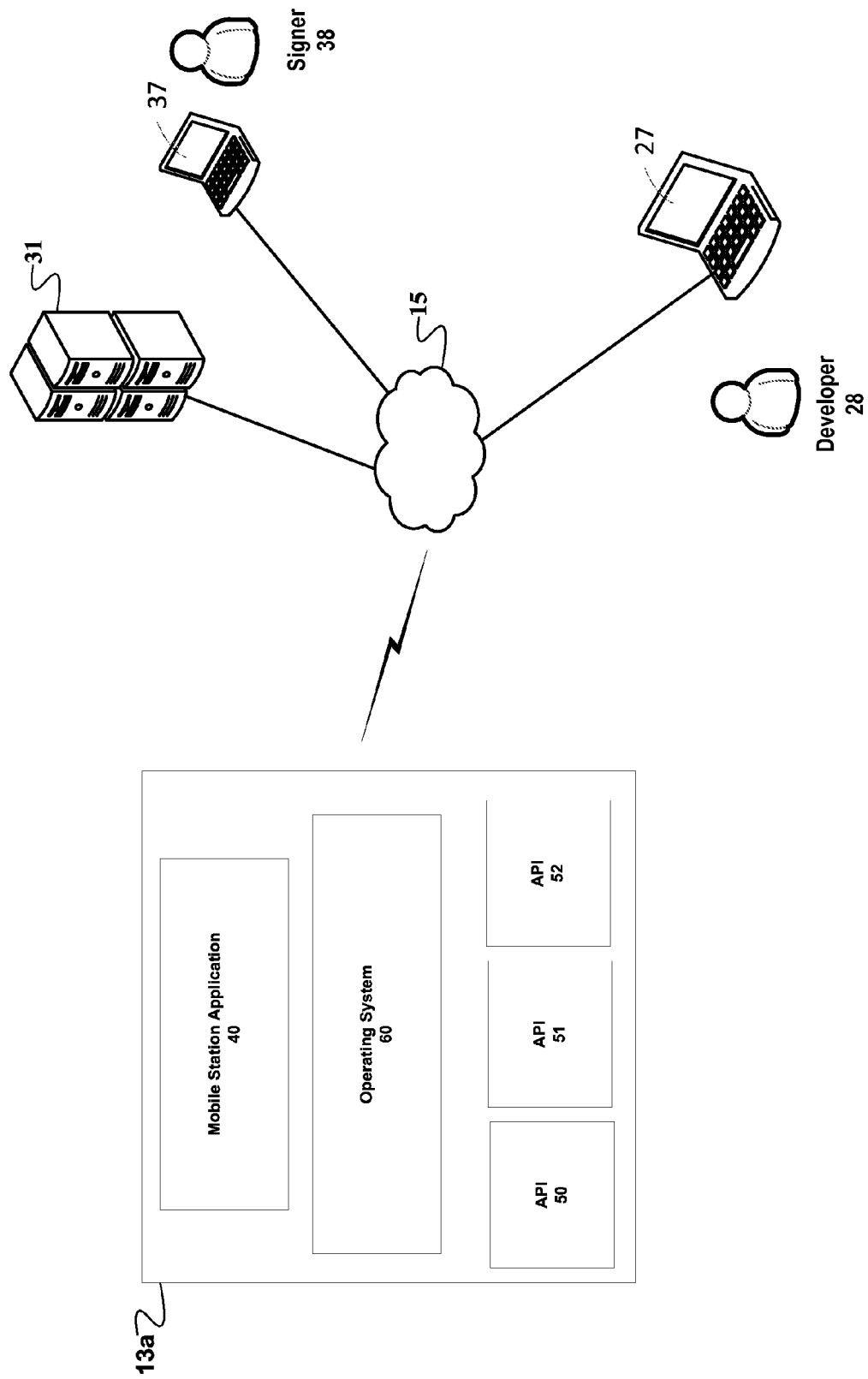
FIG. 2 is an exemplary environment for application signing.

FIG. 2 illustrates an exemplary environment for application signing in accordance with some implementations and with reference to components of FIG. 1. Particularly, FIG. 2 illustrates application signing server 31, mobile station 13a, and developer client interface 27 for the purpose of discussing exemplary interactions between application signing server 31, mobile station 13a, and developer client interface 27.

In some implementations, mobile station 13a may be interacted with by any user associated with the network illustrated in FIG. 1. Mobile station 13a may further include mobile station application 40, APIs 50-52 and operating system 60. Application signing server 31 may be interacted with by an employee of a wireless network provider associated with the network illustrated in FIG. 1. In some implementations, the application signing server 31 can provide a signer graphical user interface 37 (e.g., a point of contact (PoC) interface). The signer graphical user interface 37 may be viewed and interacted with by a signer 38 (e.g., an employee tasked with application signing) of a company that has developed APIs 50-52 resident on the mobile station 13a. For example, the signer 38 may be responsible for communicating with a third-party application vendor/developer developing a company-branded application for the mobile station 13a. The signer graphical interface may be displayed on a screen or a display of a computing device. Developer client interface 27 can be interacted with by a developer 28 who develops software applications or mobile "apps" (e.g., mobile application 40) for mobile stations serviced by the wireless network provider. The developer client interface 27 may be displayed on a screen or display of a computing device. The developer 28 may use developer client interface 27 to access application signing services provided by the application signing server 31.

In some implementations, the developer 28 may want to digitally sign an application when the developer wants to publish the application to an online application marketplace such as an "app store." To initiate an application signing process, the developer 28 may log into a developer client interface 27. The login may be performed via a mobile computer or desktop computer of the developer 28. When the developer client interface 27 is displayed to the developer 28, the developer 28 may enter an application package identifier and a password through a form or entry fields in the developer client interface 27. The application package identifier and the password may then be received from developer client interface 27 at the application signing server 31.

The application package identifier may identify an application (e.g., mobile station application 40) developed by the developer 28. The password may be previously provided by the application signing server 31 to the developer 28 of application 40, identified by the application package identifier, via developer client interface 27. For example, the password may be provided by an email to the developer 28 when the developer creates a developer account with the application signing server 31. The email may include the password and a username needed by the developer 28 to log into the developer client interface 27.

Upon authenticating the received application package identifier and the received password from the developer 28 via developer client interface 27, the application signing server 31 allows receipt of a fingerprint identifying the developer 28. As an example, the application signing server 31 may update the developer client interface 27 to display a request to the user to provide the fingerprint. The fingerprint may be provided by the developer 28 via developer client interface 27. The fingerprint may be generated using a Secure Hash Algorithm-1 (SHA-1) and is discussed further below. Upon receipt of the fingerprint from the developer client interface 27, the application signing server 31 generates a secure key for the application 40 based on the fingerprint, where the secure key is provided to the developer 28 for inclusion within the application 40.

When the application 40 including the secure key is installed at a mobile station 13a, a request for a list of one or more application programming interfaces (APIs) permitted for use by the application 40 at the mobile station 13a may be received at the application signing server 31 from an operating system 60 (or any other software component) of the mobile station 13a. The request may be initiated, for example, upon completion of installation of the application at the mobile station 13a. The request may also be initiated when the application is first executed by the user at the mobile station 13a. The request may include the application package identifier and the secure key associated with the application 40. The request may be sent as a Hyper Text Transfer Protocol-Secure (HTTPS) POST request. The request can include a Universal Resource Identifier (URI) identifying the application signing server 31. The application package identifier and the secure key can be included in a string sent via the body of the HTTPS POST request. The request may be initiated by the operating system 60 based on determining the application's 40 need to access one or more APIs resident at the mobile station 13a. Upon determining that the application package identifier and the secure key matches an authorized application package identifier and an authorized secure key stored at the application signing server 31, the application signing server 31 provides the requested list of the one or more APIs to the operating system 60. The operating system 60 at the mobile station 13a may then grant the installed application 40 access to the APIs in the list. As an example, the operating system 60 of the mobile station 13a may send a request for a list of one or more application programming interfaces in a JavaScript Object Notation (JSON) format to the application signing server 31.

In this way, because the application 40 may be granted access to a plurality of APIs based on a list from the application signing server 31 that identifies the APIs, the application signing server 31 can alleviate the burden of manually signing the application 40 for each application programming interface (API) needed the application 40. Furthermore, the application 40 can be published on online application marketplaces without the need for multiple signatures, whether or not the marketplace permits multiple signatures to be used.

In some implementations, when the signer 38 accesses the signer graphical user interface 37, the signer graphical user interface 37 may present a page for signer login and the signer 38 can be allowed to login using his/her corporate login credentials. If the signer 38 successfully logs in, then the signer graphical user interface 37 may present an interface to add third-party application information (e.g., information related to application 40) to a database of application signing server 31. Otherwise, if the login is unsuccessful, the signer graphical user interface 37 may present the signer 38 with an error page.

User interface elements (e.g., information related to application 40) presented via the signer graphical user interface 37 to add third-party application information may include, but are not limited to, (i) a text field to enter the application package name; (ii) a list of checkboxes with one checkbox per authorized API that allow the signer 38 to select one or more checkboxes; and (iii) a submit button that, when activated, provides the signer's 38 selections to application signing server 31 to identify the application package and the desired APIs of the application package.

In some implementations, a list of one or more APIs may be provided as checkboxes to signer 38 via signer graphical user interface 37. In this way, the signer 38 can select one or more APIs that are permitted to be accessed by an application package name provided by the signer 38 via the signer graphical user interface 37. As an example, the application package name may identify the application 40 developed by the developer 28. These APIs can include, for example: (a) Apps Access Point Name (APN) API, (b) Application Directed Short Messaging Service services API, (c) Single-Sign-On (SSO) API, (d) Evolved Multimedia Broadcast Multicast Service (eMBMS) services and (d) 800 APN. These APIs may be identified in the signer graphical user interface 37 as: (a) APPSAPN, (b) SMS, (c) SSO, (d) EMBMS; and (e) 800APN, respectively. These APIs are purely illustrative and are not intended to limit scope of the present application.

For example, when the Apps Access Point Name (APN) API is selected the Apps Access Point Name (APN) API can be used by an application having the application package identifier name to access one or more APN servers operated by a wireless network provider. Similarly, the Application Directed Short Messaging Service services API can be used by an application having the application package identifier name to send messaging service messages via a wireless network provider. The SSO API may be used for a session/user authentication process that permits a user to enter one username and password in order to access multiple applications. The process authenticates the user for all applications the user has been given rights to and eliminates further prompts when the user switches applications during an authenticated session. The eMBMS API may be used to access eMBMS services provided by the wireless network provider. eMBMS is an effective way to lower cost per bit when delivering the same content simultaneously to multiple end users. As the multicast standard for LTE, eMBMS allows multimedia content to be sent once and received by many end users. This "one-to-many" distribution mode can be a valuable alternative to unicast when a large number of users are interested in the same content. The 800 APN may be used to access 800 or "free" data-usage services. Data connections that originate from device IP addresses within a pre-determined range of 800 APN IP addresses may be paid by 3rd-party service vendors and can be free of charge to an end user of the mobile station 13a.

In some implementations, in response to the signer 38 selecting the submit button in the signer graphical user interface 37, the signer graphical user interface 37 submits information provided by the signer 38 to the application signing server 31. If the application signing server 31 successfully receives the information provided by the signer 38 via the signer graphical user interface 37, the application signing server 31 may proceed with the one or more of the following steps:

(I) If an application package name provided by the signer 38 via the signer graphical user interface 37 does not exist in a database of application signing server 31 then the application signing server 31 may:
 (a) Store the package name provided by the signer 38 in the database;
 (b) Store the authorized API names selected by the signer 38 and associate them with the package name;
 (c) Generate a random string with particular number alpha-numeric characters (including special characters) as an application developer password for signing into the application signing server 31 via the developer client interface 27. The particular number of alpha-numeric characters can be, for example, twenty alpha-numeric characters;
 (d) Store the application developer password in the database and associate it to the application package name; and
 (e) Generate a "salt" random string and store it in the database associated to the application package name.

(II) If the package name does exist in the database of application signing server 31, then the application signing server 31 may:
 (a) Update the authorized API names associated to the package name with new values selected by the signer 38 via the signer graphical user interface 37;
 (b) Re-create an app vendor identifier (ID) identifying developer 27; and
 (c) Perform no modifications on the generated "salt" random string.

If the application signing server 31 completes the foregoing stages of (I) or (II), then the application signing server 31 may return the app vendor ID associated with the package name in a response webpage displayed at signer graphical user interface 37. The app vendor ID may be created using a cipher (e.g., Leet). For example, assuming that the package name is com.mypackage.AppName, the app vendor ID can be: C0m$My9AcKa63$a99NaMe. In this example, capital and small letters in the package name have been alternated, dots have been replaced with dollar signs and one or more letters have been replaced with numbers. This example is purely illustrative and is not intended to limit the scope of the present application.

In some implementations, the app vendor ID may be used by the developer 27 as a password to sign into application signing server 31 via developer client interface 27. The app vendor ID may be provided by signer 38 to developer 27 via secure email. As noted above, the developer 28 may develop applications, such as mobile apps, for the mobile station 13a. For example, developer 28 may develop branded applications for mobile stations or devices specific to the brand. If the developer 28 accesses application signing server 31 via developer interface 27, then the developer 28 can be presented with a login page at developer interface 27 and the page can allow developer 28 to enter the package name as the login and the app vendor ID generated by the signer 38 at signer graphical user interface 37 as the password. The app vendor ID may be communicated by signer 38 to developer 28 via other communication channels (e.g. secure email).

In some implementations, if the developer 28 successfully logs into the application signing server 31 via the developer interface 27, the developer interface 27 may display:

(i) A package name used for login;

(ii) A text field for the developer 28 to enter the Secure Hash Algorithm-1 (SHA-1) fingerprint of the application certificate. As an example, the fingerprint (or hash) may be provided in the following format:

<Sha-1>::= <hex byte>19\*":"<hex byte>
<hex byte>::=%x00-FF

An example of fingerprint value may be:
6B:7B:18:CC:D8:87:35:74:8D:C5:0C:D2:38:72:16:28: 37:0B:B7:8D In some implementations, if the developer 28 selects the Submit button in the developer interface 27 then the developer interface 27 posts the fingerprint provided by the developer 28 to the application signing server 31. If the application signing server 31 successfully receives the fingerprint then:

(i) The application signing server 31 may store the fingerprint and associate it to the package name provided during login by the developer 28; and (ii) For each API associated to this package name:
(a) Retrieve the "salt" string;
(b) Calculate: HMAC_SHA-1 (<package name>||<SHA-1 fingerprint>,<salt>); and
(c) Return a <meta-data> tag as follows:
<meta-data android: name="com.verizon.api" android: value="<Calculated HMAC_SHA-1>"/>

In some implementations, a mobile station client may be included in the operating system 60 of mobile client. The mobile station client may configure operating system 60 to query the application signing server 31 to check if a particular application identified by its package name and SHA-1 fingerprint is authorized to access a particular API. The app vendor ID and the generated salt may be securely stored as encrypted data in a database at application signing server 31. For example, application signing server 31 may store an example Message Digest 5 (MD5) hash of "<package name>II<app vendor ID>" for authentication purposes. The meta-data tag may indicate that information associated with the tag is to be treated as metadata. Metadata is data characterizing data or information. Structural metadata relates to design and specification of data structures and is more properly called "data about the containers of data." Descriptive metadata, on the other hand, is about individual instances of application data, the data content. In the above, example, android: name="com.verizon.api" android:value="<Calculated HMAC_SHA-1>" is descriptive metadata. As information has become increasingly digital, metadata are also used to describe digital data using metadata standards specific to a particular discipline. By describing the contents and context of data files, the quality of the original data/files is greatly increased. For example, a text document's metadata may contain information about how long the document is, who the author is, when the document was written, and a short summary of the document. Similarly, the "<meta-data>" tag may be used by the application signing server to describe contents and context of data and files provided by the application signing server 31.

In some implementations, when the operating system 60 needs to verify if a certain application is authorized to use a certain API resident at the mobile station 13a, then operating system 60 makes a JSON request embedded in a Hyper Text Transfer Protocol Secure POST (HTTPS POST) request as follows:

```
...
Content-Type: application/json
....
{
    "request": {
        "id":"<package-name>",
        "fingerprint":"HMAC_SHA1(<SHA-1 fingerprint>,<SHA-1 meta-data>)"
    },
    *"request": {...}
}
```

If the application signing server 31 successfully receives the JSON request, the application signing server 31 may use the provided package name and API name in the request along with the SHA-1 fingerprint and salt stored in the application signing server's 31 database to calculate, for example:

HMAC_SHA1 (<SHA-1:fingerprint>,HMAC_SHA1 (<SHA-1 fingerprint>,salt)). As a purely illustrative example, a keyed-hash message authentication code (HMAC) is a construction for calculating a message authentication code (MAC) involving a cryptographic hash function in combination with a secret cryptographic key. As with any MAC, it may be used to simultaneously verify both the data integrity and the authentication of a message. Any cryptographic hash function, such as MD5 or SHA-1, may be used in the calculation of an HMAC; the resulting MAC algorithm may be termed HMAC-MD5 or HMAC-SHA1 accordingly. Thus, application signing server 31 may use "HMAC_SHA1 (<SHA-1:fingerprint>,HMAC_SHA1(<SHA-1 fingerprint>, salt))" to simultaneously verify both the data integrity and authenticity of the JSON request received from the operating system 60. If the message is authenticated by the application signing server 31, the application signing server 31 may return a response to the JSON request.

The application signing server 31 may provide the JSON response embedded in a Hyper Text Transfer Protocol (HTTP) response as follows:

```
...
Content-type: application/json
{
    "response": {
        "id":"<package name>",
        "api":["<API name>", "<API name>"...] //list
of API names associated with this package name
    }
}
```

Thus, in some implementations, upon verifying the data integrity and authenticity of the JSON request, the application signing server 31 provides the requested list of the one or more APIs to the operating system 60. The operating system 60 at the mobile station 13a may then grant the application 40 access to the APIs in the list. In this way, because the application 40 may be granted access to a plurality of APIs based on a list from the application signing server 31 that identifies the APIs, the application signing server 31 can alleviate the burden of manually signing the application 40 for each application programming interface (API) needed the application 40. In this way, the application 40 can be published on online application marketplaces without the need for multiple signatures, whether or not the marketplace permits multiple signatures to be used. Furthermore, because the application 40 may need to be signed once regardless of a number of APIs that the application 40 may need to access, application signing in accordance with the disclosed implementations is efficient and consumes significantly less time.

In some implementations, the developer 28 may create one or more groups of applications that may need to access one or more APIs resident at the mobile station 13a. For example, the developer 28 may use the developer client interface 27 to select application identifiers A, B and C and associate the identifiers with a single group of APIs C, D and E available at the mobile station 13a. Thus, the application identifiers need not be each separately assigned to the APIs C, D and E and can be together associated at once with a group of APIs. This saves time and enhances user experience for the developer. The developer 28 may use the developer client interface 27 to also create groups of application identifiers (e.g., identifiers A, B and C and associate the groups of identifiers with groups of APIs (e.g., a group of APIs C, D and E) resident at the mobile station 13a.

In some implementations, the signer graphical user interface 37 and the developer client interface 27 may use HTTPS connections when communicating with application signing server 31. In some implementations, the communications of operating system 60 with application signing server 31 may be over HTTP. Signer graphical user interface 37, developer client interface 27 and operating system 60 may each use a different URL to access application signing server 31. In some aspects, signing server 31 may allow access to the mobile station 13a only via a mobile station client operating in the operating system 60. During any of the foregoing steps discussed above, if an error is encountered at application signing server 31, the application signing server 31 may return an error message to the mobile station 13a, signing interface 37 or developer interface 27.

Figure 3:
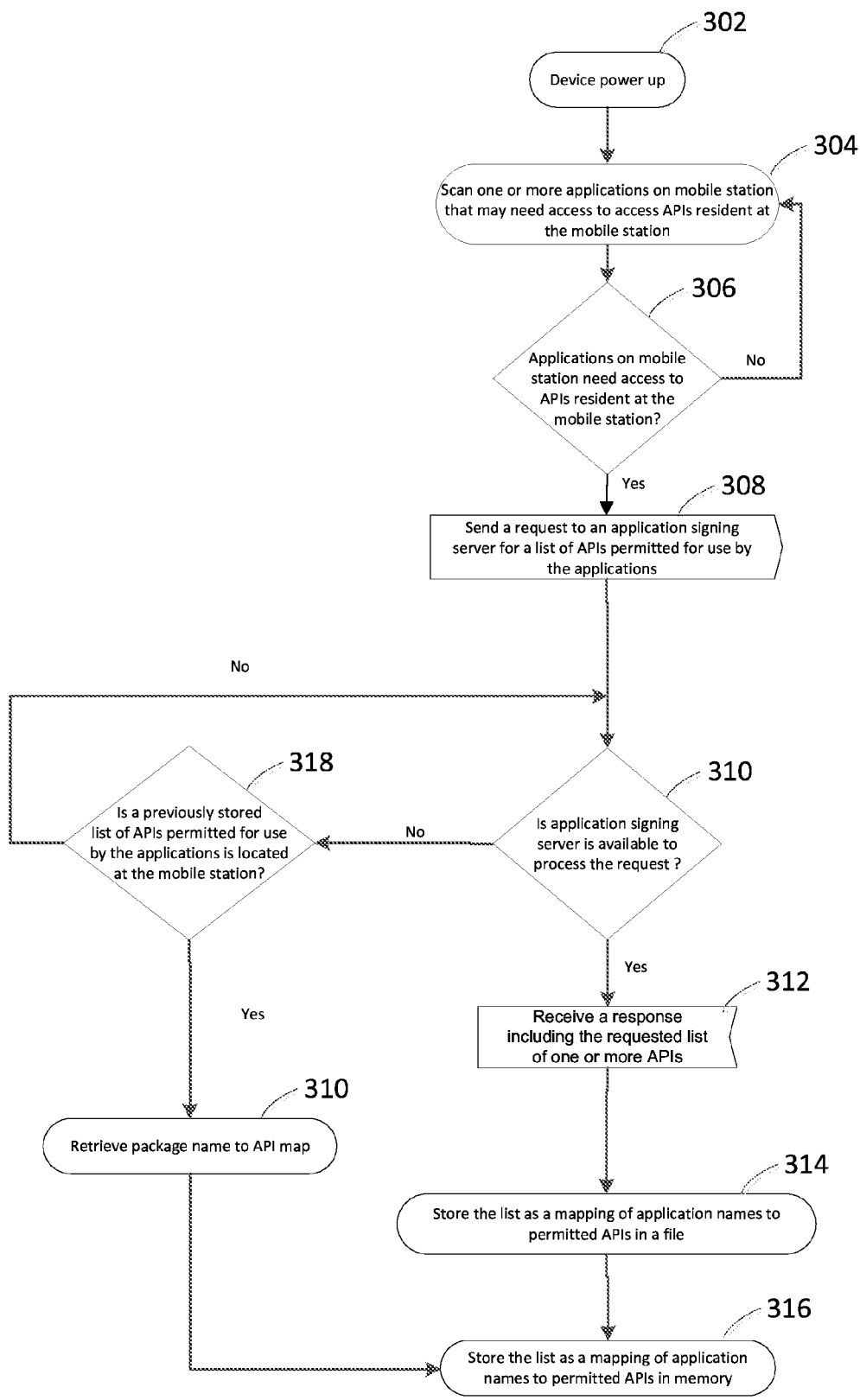
FIG. 3 is an exemplary process for application signing.

Referring to FIG. 3, a process 300 for application signing can be initiated when a mobile station is powered up or turned on (step 302). As an example, mobile station 13a may be powered up when a user selects a power button on the mobile station 13a. Then, an operating system of the mobile station 13a may scan one or more applications on the mobile station 13a that may need access to one or more APIs resident at the mobile station 13a (step 304). As an example, operating system 60 (or a mobile station client included in operating system 60) of the mobile station 13a may scan one or more applications on the mobile station 13a that may need access to one or more APIs resident at the mobile station 13a.

If one or more applications on the mobile station 13a need access to one or more APIs resident at the mobile station 13a (Yes, step 306), the operating system 60 of the mobile station 13a may send a request to an application signing server for a list of one or more application programming interfaces (APIs) permitted for use by the applications needing access to the one or more APIs (step 308). As an example, the operating system 60 of the mobile station 13a may send a request for a list of one or more application programming interfaces request in a JSON format to the application signing server 31. The request may be sent when the one or more applications are installed at the mobile station 13a or at any time when the applications are executing on the mobile station 13a. The request may be sent from the mobile station 13a to the application signing server 31 over the network 15.

Returning to step 306, if no applications on the mobile station 13a need access to one or more APIs resident at the mobile station 13a (No, step 306), method 300 returns to step 304.

Following the request of step 308, if the application signing server is available to process the request (Yes, step 310), the mobile station 13a receives a response including the requested list of one or more application programming interfaces (step 312). As an example, the mobile station 13a may receive a response including a list of one or more APIs permitted for use by the one or more applications resident at the mobile station 13a in a JavaScript Object Notation (JSON) format from application signing server 31. JSON, or JavaScript Object Notation, is an open standard format that uses human-readable text to transmit data objects. While JSON is convenient to use, it is to be appreciated that the implementations are not limited to JSON and any other data format may be used for the response including the requested list of one or more application programming interfaces.

The operating system of the mobile station 13a then stores the list as a mapping of application names to permitted APIs in a file resident at the mobile station 13a (step 314) and also in a memory of the mobile station 13a for access by applications resident at the mobile station 13a (step 316). As an example, the operating system 60 of the mobile station 13a may store the list including a mapping of application names to permitted APIs in a file resident at the mobile station 13a.

Following the request of step 310, if the application signing server is not available to process the request (No, step 310), the mobile station determines if a previously stored list of one or more APIs permitted for use by the applications is located at the mobile station (step 318). As an example, operating system 60 of the mobile station 13a may check if a file including a mapping of application names to permitted APIs is stored at the mobile station 13a. The previously stored list may be for example, a list retrieved at an earlier time from the application signing server. The previously stored list may only be used when application signing server is not available (e.g., offline).

If the previously stored list is located at the mobile station (Yes, step 318), the operating system of the mobile station stores the list in a memory of the mobile station (step 316). As an example, operating system 60 of the mobile station 13a store the list including a mapping of application names to permitted APIs in a memory of the mobile station 13a. If the previously stored list is not located at the mobile station (No, step 318), process 300 returns to check if the application signing server is available to process the request (step 310).

Figure 4:
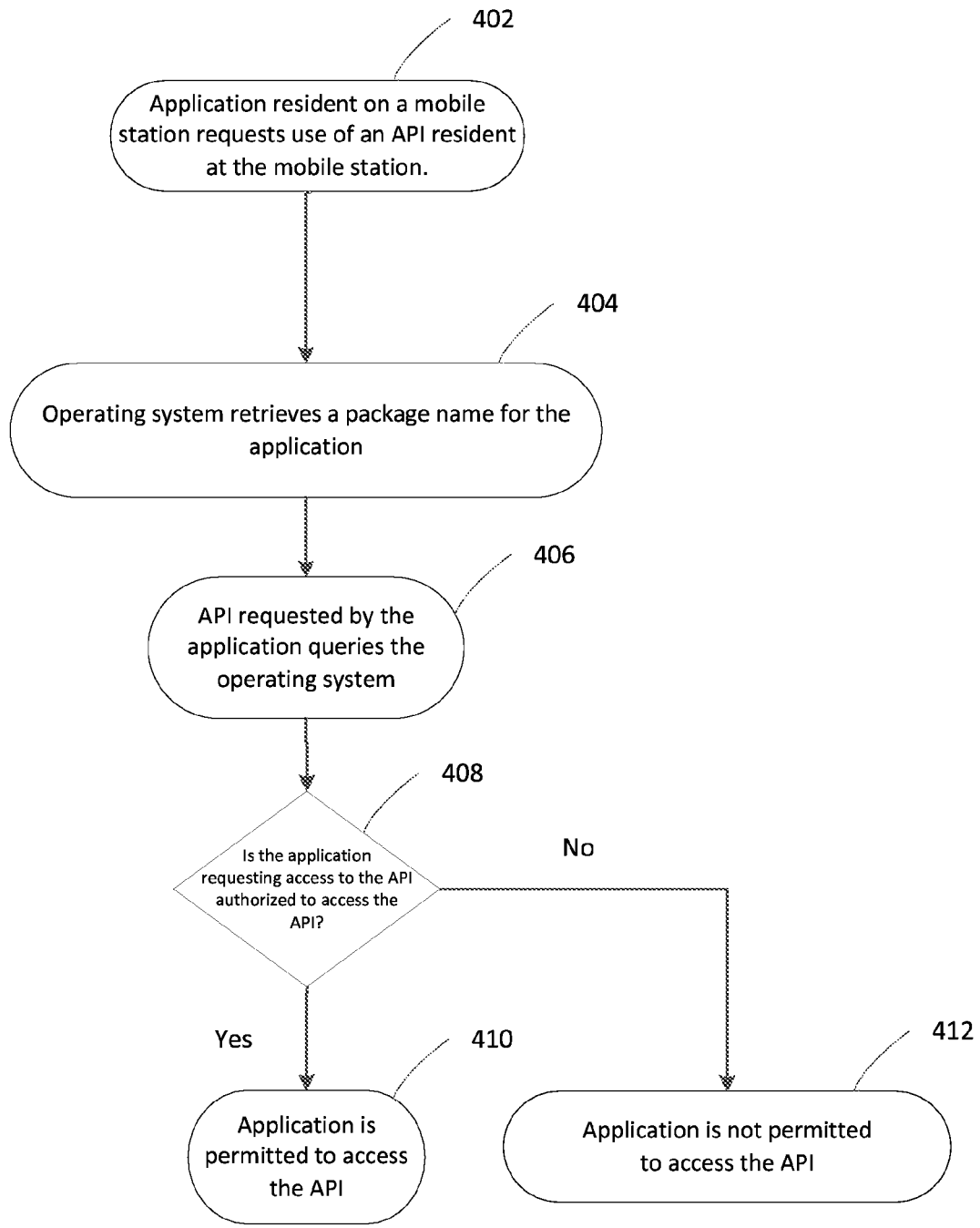
FIG. 4 is an exemplary process for permitting access to an application programming interface on a mobile station.

Referring to FIG. 4, a process 400 for granting an application access to one or more APIs is described. Process 400 begins when an application resident on a mobile station calls or requests use of an API resident at the mobile station (step 402). Such a request may be detected by the operating system 60 of the mobile station 13a.

Responsive to the request of step 402, the operating system retrieves a package name for the application (step 404). As an example, if the operating system 60 of the mobile station 13a has granted permission to the application 40 to access the API (e.g., API 50) requested by the application 40, the requested API retrieves a package name for the application 40.

The API requested by the application in step 402 may then query the operating system of the mobile station (step 406) and determine if the application requesting access to the API is authorized to access the API (step 408). As an example, the requested API (e.g., API 50) may query operating system 60 to determine if the requesting application 40 is authorized to access the requested API resident at the mobile station 13a. As discussed above, to determine if the requesting application 40 is authorized to access the requested API resident at the mobile station 13a the operating system 60 of the mobile station may send a request to the application signing server 31 for a list of one or more application programming interfaces (APIs) permitted for use by the application 40. The operating system 60 may then receive a response including a list of one or more APIs permitted for use by the by the application 40 in a JSON format from application signing server 31.

Responsive to the request of step 408, if the application is authorized to access the API (Yes, step 408), then the application is permitted to access the API (step 410). If the application is not authorized to access the API (No, step 408), then the application is not permitted to access the API (step 412).

The enhanced application signing service under consideration here may be delivered to touch screen type mobile stations as well as to non-touch type mobile stations. Hence, our simple example shows the mobile station (MS) 13a as a non-touch type mobile station and shows the mobile station (MS) 13b as a touch screen type mobile station. Implementation of the on-line application signing service will involve at least some execution of programming in the mobile stations as well as implementation of user input/output functions and data communications through the network 15, from the mobile stations.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 5:
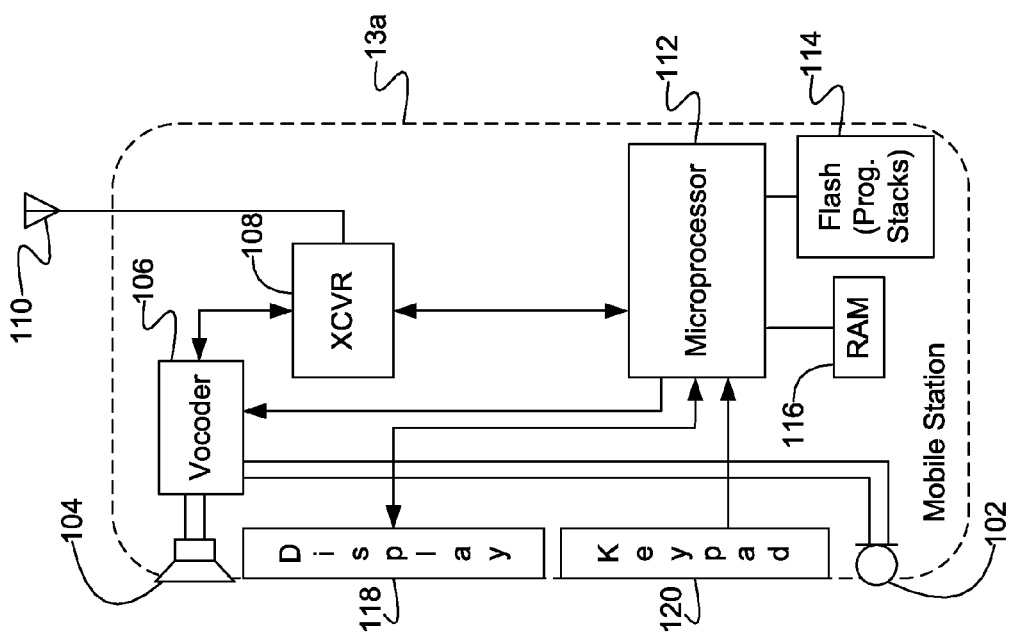
FIG. 5 is a high-level functional block diagram of an exemplary non-touch type mobile station as may utilize the application signing service through a network/system like that shown in FIG. 1.

For purposes of such a discussion, FIG. 5 provides a block diagram illustration of an exemplary non-touch type mobile station 13a. Although the mobile station 13a may be a smartphone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including interfaces for the application signing service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the application signing service.

A microprocessor 112 serves as a programmable controller for the mobile station 13a, in that it controls all operations of the mobile station 13a in accord with programming that it executes, for all normal operations, and for operations involved in the application signing procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing application signing.

Figure 6:
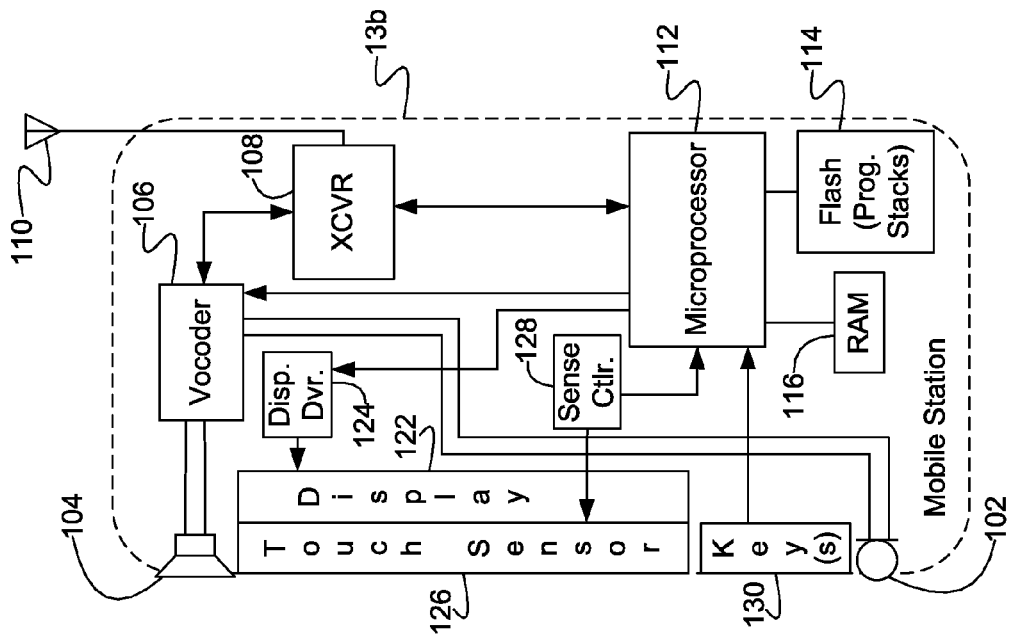
FIG. 6 is a high-level functional block diagram of an exemplary touch screen type mobile station as may utilize the application signing service through a network/system like that shown in FIG. 1.

For purposes of such a discussion, FIG. 6 provides a block diagram illustration of an exemplary touch screen type mobile station 13b. Although possible configured somewhat differently, at least logically, a number of the elements of the exemplary touch screen type mobile station 13b are similar to the elements of the mobile station 13a, and are identified by like reference numbers in FIG. 6. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the application signing procedure under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing application signing.

In the example of FIG. 5 the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to some application signing related functions.

The structure and operation of the mobile stations 13a and 13b, as outlined above, were described to by way of example, only.

As shown by the above discussion, functions relating to the an enhanced application signing experience for the application signing service, via a graphical user interface of a mobile station may be implemented on computers connected for data communication via the components of a packet data network, operating as an application signing server as shown in FIG. 1. Although special purpose devices may be used, such devices also may be implemented using one or more hardware platforms intended to represent a general class of data processing device commonly used to run "server" programming so as to implement the application signing functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for application signing. The software code is executable by the general-purpose computer that functions as the application signing server and/or that functions as an application signing enabled terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for application signing, in essentially the manner performed in the implementations discussed and illustrated herein.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of application signing outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wireless network provider operating application signing server 31 into the computer platform of the mobile station 13a. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement application signing etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at an application signing server, an application package identifier and a password, the password previously provided by the application signing server to a developer of an application identified by the application package identifier;
upon authenticating the received application package identifier and the received password, allowing receipt of a fingerprint identifying the developer from the developer of the application;
upon receipt of the fingerprint from the developer, generating, at the application signing server, a secure key for the application based on the fingerprint, wherein the secure key is provided to the developer for inclusion within the application;
when the application including the secure key is installed at a mobile device, receiving at the application signing server, from an operating system of the mobile device, a request for a list of one or more application programming interfaces (APIs) the application is to be granted access to at the mobile device, the request including the application package identifier and the secure key associated with the application, the request based on a call from the application to access one or more APIs resident at the mobile device;
upon determining that the application package identifier and the secure key matches an authorized application package identifier and an authorized secure key stored at the application signing server, providing from the application signing server the requested list of the one or more APIs to the mobile device operating system; and
granting the installed application access to the APIs in the list.

2. The method of claim 1, further comprising:
receiving the application package identifier via a user interface at a client device of the developer;
determining whether the application package identifier exists in a database of the application signing server; and
when the application package identifier does not exist in a database of the application signing server:
storing the application package identifier in the database;
generating a random string as a developer password; and
associating the developer password with the application package identifier.

3. The method of claim 2, further comprising:
when the application package identifier exists in the database of the application signing server:
updating one or more API names associated with the application package identifier with API names selected by the developer via the user interface; and
associating the updated API names with the application package identifier.

4. The method of claim 1, further comprising:
for each API associated with the received package identifier:
retrieving a salt string;
calculating a hash-based message authentication code (HMAC) using a secure hash algorithm (SHA) based on the received package identifier, the retrieved salt string and the received fingerprint; and
generating metadata based on the calculated HMAC and metadata used for validation of the request for a list of one or more application programming interfaces (APIs).

5. The method of claim 4, further comprising:
upon receipt of the request from the operating system, using one or more of the provided package identifier, a name of the one or more APIs resident at the mobile device, the fingerprint, the generated metadata, and the salt string to validate the request; and
providing the list of the one or more APIs as a JavaScript Object Notation (JSON) response to the operating system.

6. The method of claim 1, further comprising:
receiving the request for the list of the one or more APIs through a JavaScript Object Notation (JSON) request embedded in a Hyper Text Transfer Protocol (HTTP) post request.

7. The method of claim 1, wherein the APIs include at least one of a single sign on (SSO) API, an Access Point Name (APN) API, or an application directed short messaging service (SMS) API.

8. An application signing server comprising:
a communication interface configured to enable communication via a mobile network;
a processor coupled with the communication interface;
a storage device accessible to the processor; and
an executable program in the storage device, wherein execution of the program by the processor configures the server to perform functions, the functions including:
receiving, at the application signing server, an application package identifier and a password, the password previously provided by the application signing server to a developer of an application identified by the application package identifier;
upon authenticating the received application package identifier and the received password, allowing receipt of a fingerprint identifying the developer from the developer of the application;
upon receipt of the fingerprint from the developer, generating, at the application signing server, a secure key for the application based on the fingerprint, wherein the secure key is provided to the developer for inclusion within the application;
when the application including the secure key is installed at a mobile device, receiving at the application signing server, from an operating system of the mobile device, a request for a list of one or more application programming interfaces (APIs) the application is to be granted access to at the mobile device, the request including the application package identifier and the secure key associated with the application, the request based on a call from the application to access one or more APIs resident at the mobile device;

upon determining that the application package identifier and the secure key matches an authorized application package identifier and an authorized secure key stored at the application signing server, providing from the application signing server the requested list of the one or more APIs to the mobile device operating system; and granting the installed application access to the APIs in the list.

9. The server of claim 8, wherein the functions further include:

receiving the application package identifier via a user interface at a client device of the developer;

determining whether the application package identifier exists in a database of the application signing server; and when the application package identifier does not exist in a database of the application signing server:

storing the application package identifier in the database;

generating a random string as a developer password; and associating the developer password with the application package identifier.

10. The server of claim 9, wherein the functions further include:

when the application package identifier exists in the database of the application signing server:

updating one or more API names associated with the application package identifier with API names selected by the developer via the user interface; and associating the updated API names with the application package identifier.

11. The server of claim 8, wherein the functions further include:

for each API associated with the received package identifier:

retrieving a salt string;

calculating a hash-based message authentication code (HMAC) using a secure hash algorithm (SHA) based on the received package identifier, the retrieved salt string and the received fingerprint; and generating metadata based on the calculated HMAC, the metadata used for validation of the request for a list of one or more application programming interfaces (APIs).

12. The server of claim 11, wherein the functions further include:

upon receipt of the request from the operating system, using one or more of the provided package identifier, a name of the one or more APIs resident at the mobile device, the fingerprint, the metadata, and the salt string to validate the request; and providing the list of the one or more APIs as JavaScript Object Notation (JSON) response to the operating system.

13. The server of claim 8, wherein the functions further include:

receiving the request for the list of the one or more APIs through a JavaScript Object Notation (JSON) request embedded in a Hyper Text Transfer Protocol (HTTP) post request.

14. The server of claim 8, wherein the APIs include at least one of a single sign on (SSO) API, an Access Point Name (APN) API, or an application directed short messaging service (SMS) API.

15. A non-transitory computer-readable medium comprising instructions which, when executed by one or more processors included in an application signing server, cause the one or more processors to:

receive, at the application signing server, an application package identifier and a password, the password previously provided by the application signing server to a developer of an application identified by the application package identifier;

upon authenticating the received application package identifier and the received password, allow receipt, from the developer of the application, of a fingerprint identifying the developer;

upon receipt of the fingerprint from the developer, generate, at the application signing server, a secure key for the application based on the fingerprint, wherein the secure key is provided to the developer for inclusion within the application;

when the application including the secure key is installed at a mobile device, receive at the application signing server, from an operating system of the mobile device, a request for a list of one or more application programming interfaces (APIs) the application is to be granted access to at the mobile device, the request including the application package identifier and the secure key associated with the application, the request based on a call from the application to access one or more APIs resident at the mobile device; and upon determining that the application package identifier and the secure key matches an authorized application package identifier and an authorized secure key stored at the application signing server, provide from the application signing server the requested list of the one or more APIs to the mobile device operating system; and grant the installed application access to the APIs in the list.

16. The computer readable medium of claim 15, further comprising instructions which cause the one or more processors to:

receive the application package identifier via a user interface at a client device of the developer;

determine whether the application package identifier exists in a database of the application signing server; and when the application package identifier does not exist in a database of the application signing server:

store the application package identifier in the database;

generate a random string as a developer password; and associate the developer password with the application package identifier.

17. The computer readable medium of claim 16, further comprising instructions which cause the one or more processors to:

when the application package identifier exists in the database of the application signing server:

update one or more API names associated with the application package identifier with API names selected by the developer via the user interface; and associate the updated API names with the application package identifier.

18. The computer readable medium of claim 15, further comprising instructions which cause the one or more processors to:
for each API associated with the received package identifier:
retrieve a salt string;
calculate a hash-based message authentication code (HMAC) using a secure hash algorithm (SHA) based on the received package identifier, the retrieved salt string and the received fingerprint; and
generate metadata based on the calculated HMAC and the metadata used for validation of the request for a list of one or more application programming interfaces (APIs).

19. The computer readable medium of claim 18, further comprising instructions which cause the one or more processors to:
upon receipt of the request from the operating system, using one or more of the provided package identifier, a name of the one or more APIs resident at the mobile device, the fingerprint, the generated metadata, and the salt string to validate the request; and
provide the list of the one or more APIs as JavaScript Object Notation (JSON) response to the operating system.

20. The computer readable medium of claim 15, further comprising instructions which cause the one or more processors to:
receive the request for the list of the one or more APIs through a JavaScript Object Notation (JSON) request embedded in a Hyper Text Transfer Protocol (HTTP) post request.

* * * * *